(No Model.)
J. H. GILMAN.
CYLINDER FOR CORN SHELLERS.
No. 325,671. Patented Sept. 8, 1885.
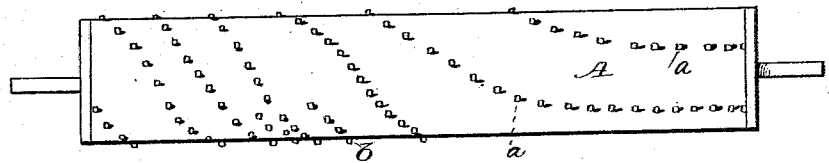
WITNESSES:
INVENTOR
ATTORNEY

UNITED STATES PATENT OFFICE.

JOHN H. GILMAN, OF OTTAWA, ILLINOIS.

CYLINDER FOR CORN-SHELLERS.

SPECIFICATION forming part of Letters Patent No. 325,671, dated September 8, 1885.

Application filed August 20, 1884. (No model.)

*To all whom it may concern:*

Be it known that I, JOHN H. GILMAN, a citizen of the United States, residing at Ottawa, in the county of La Salle and State of Illinois, have invented certain new and useful Improvements in Cylinders for Corn-Shellers, of which the following is a specification, reference being had to the accompanying drawing.

My invention relates to certain new and useful improvements in that class of corn-shellers wherein the grain is detached from the cob by means of a rotating cylinder provided with spiral rows of teeth acting in conjunction with a stationary shelling-bar.

In this class of shellers it has been heretofore customary to provide the cylinder with a number of spiral rows extending along its entire length with either a regular uniform pitch or with a decreasing pitch from the hopper end of the cylinder to the exit end. The latter arrangement is fully set forth in an application filed simultaneously herewith by S. E. King and myself as joint inventors. I have found, however, by actual experiment, that an improved result is obtained by arranging the rows of teeth in two distinct series along the length of the cylinder. The first of these series extends to and slightly beyond that portion of the cylinder which revolves within the hopper-chamber, and the teeth are arranged in quick parallel spirals of from two to four rows. The second series begins where the first ends, comprises a greater number of rows, and the pitch is much less than that of the first series.

In the accompanying drawing I have illustrated this construction, the figure representing a side elevation of a corn-shelling cylinder the teeth of which are arranged in accordance with my invention.

Referring to the designating-letters, A represents the cylinder, which is of the ordinary construction, or any desired modification thereof appropriate to the uses of my invention.

At the forward end of the cylinder, where the corn is first fed, (shown upon the right of the figure,) I insert a series of rows of shelling-teeth, *a*, the same being arranged in a quick spiral, as shown, and extending about two-thirds of the entire length of the cylinder, or less, but slightly beyond what is known as the "mouth" of the machine. Where the first series ends I begin a second series of teeth, *b*, of greater length of row and lesser pitch, extending to the end of the cylinder, and containing, moreover, a greater number of rows.

The action of the two parts, it will be seen, is essentially different. The quick pitch of the first series hastens the ears in the unconfined mouth to the more confined outer cover of the sheller, thus keeping this part of the sheller always full. The lesser pitch in the second series decreases the rapidity with which the ears advance toward the cob end and retains them in the confined body until they are completely and effectually shelled.

By my improved arrangement I am enabled, therefore, to pass the ears quickly from the first part of the cylinder, where they are deprived of the greater part of their kernels, to a second or confined portion, which is kept constantly filled, and where they are gradually and completely shelled, effecting a notable economy in time and increasing the capacity of the sheller for actual work.

Having thus described my invention, what I claim as new is—

In a corn-sheller of the kind described, the cylinder A, provided at its mouth or hopper end with a series of spiral rows of teeth of quick pitch, and for the remainder of its length with a series of spiral rows of teeth beginning where the first series ends, and of lesser pitch and greater number of rows, substantially as shown and described.

In testimony whereof I affix my signature in presence of two witnesses.

JOHN H. GILMAN.

Witnesses:
 THOMAS E. MACKINLAY,
 EDWARD F. DAVIS.